(12) United States Patent
Fan et al.

(10) Patent No.: US 7,778,183 B2
(45) Date of Patent: *Aug. 17, 2010

(54) DATA REPLICA SELECTOR

(75) Inventors: Jinliang Fan, Redmond, WA (US);
Nagui Halim, Yorktown Heights, NY (US); Zhen Liu, Tarrytown, NY (US);
Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 11/676,631

(22) Filed: Feb. 20, 2007

(65) Prior Publication Data
US 2008/0198752 A1 Aug. 21, 2008

Related U.S. Application Data

(63) Continuation-in-part of application No. 11/395,018, filed on Mar. 31, 2006.

(51) Int. Cl.
*G08C 15/00* (2006.01)

(52) U.S. Cl. ............................ 370/238; 370/254; 704/4; 709/238

(58) Field of Classification Search ................. 370/254; 714/4
See application file for complete search history.

(56) References Cited

U.S. PATENT DOCUMENTS

| | | | |
|---|---|---|---|
| 5,806,075 A | 9/1998 | Jain et al. | |
| 5,832,514 A * | 11/1998 | Norin et al. | 707/202 |
| 6,163,856 A | 12/2000 | Dion et al. | |
| 6,335,937 B1 | 1/2002 | Chao et al. | |
| 6,411,991 B1 | 6/2002 | Helmer et al. | |
| 6,496,941 B1 | 12/2002 | Segal et al. | |
| 7,480,817 B2 * | 1/2009 | Fan et al. | 714/4 |
| 2002/0091855 A1 * | 7/2002 | Yemini et al. | 709/238 |
| 2008/0270822 A1 * | 10/2008 | Fan et al. | 714/4 |

OTHER PUBLICATIONS

L. Rizzo, "Effective Erasure Codes for Reliable Computer Communication Protocols," *SIGCOMM Comput. Commun. Rev.*, vol. 27, No. 2, pp. 1-13 (1997).
Bakkaloglu, et al., "Modeling Correlated Failures in Survivable Storage Systems," *Fast Abstract at IEEE International Conference on Dependable Systems & Networks*, pp. 1-2(2002).

(Continued)

*Primary Examiner*—Albert T Chou
(74) *Attorney, Agent, or Firm*—Stephen Bongini; Fleit Gibbons Gutman Bongini & Bianco P.L.

(57) ABSTRACT

A method is provided for selecting a replication node from eligible nodes in a network. A multidimensional model is constructed that defines a multidimensional space and includes the eligible nodes, with each of the dimensions of the multidimensional model being a system characteristic. A data availability value is determined for each of the eligible nodes, and a cost of deploying is determined for each of at least two availability strategies to the eligible nodes. At least one of the eligible nodes is selected for replication of data that is stored on a source node in the network. The selecting step includes selecting the eligible node whose: data availability value is determined to be highest among the eligible nodes whose cost of deploying does not exceed a specified maximum, or cost of deploying is determined to be lowest among the eligible nodes whose data availability value does not exceed a specified minimum.

18 Claims, 9 Drawing Sheets

OTHER PUBLICATIONS

Weatherspoon, et al., "Introspective Failure Analysis: Avoiding Correlated Failures in Peer-to-Peer Systems," *21st IEEE Symposium on Reliable Distributed Systems (SRDS'02)*, pp. 1-6 (Oct. 2002).

Bhagwan, et al., "Total Recall: System Support for Automated Availability Management," *First ACM/Usenix Symposium on Networked Systems Design and Implementation (NSDI)*, pp. 1-14 (2004).

* cited by examiner

DATA REPLICA SELECTOR

CROSS-REFERENCE TO RELATED APPLICATIONS

This application is a Continuation-in-Part of prior U.S. patent application Ser. No. 11/395,018, filed Mar. 31, 2006, entitled "DATA REPLICA SELECTOR", the entire teachings of which are herein incorporated by reference.

STATEMENT REGARDING FEDERALLY SPONSORED RESEARCH OR DEVELOPMENT

This invention was made with Government support under Contract No.: TIAH98230-04-3-0001 awarded by the U.S. Department of Defense. The Government has certain rights in this invention.

FIELD OF THE INVENTION

This invention relates in general to information availability and failure recovery, and more particularly to selection of information replication locations based on a multidimensional model.

BACKGROUND OF THE INVENTION

Reliable backup of data is an important aspect of any computing system where loss of, or lack of access to, data would be detrimental to the system. For a backup system to be effective, at least one replica of the data should survive a failure, or data-destroying event, so that the data can be recovered and/or readily accessed. Such failures may happen as a result of catastrophic events (e.g., terrorist attacks and military actions), extreme weather phenomena (e.g., hurricanes and earthquakes), large-scale network correlated failures (e.g., routing protocol failures, DOS attacks causing congestion, and worms), viruses, power blackouts, power surges, and other similar events. To survive such events, data should be replicated on nodes that are unlikely to be affected by concurrent failures (i.e., failures affecting multiple system nodes simultaneously).

Adding to the problem is the fact that information technology systems today are much more interconnected and interdependent and, as a result, may more frequently be simultaneously impacted by the same failures. At the same time, the types of failures that can impact system data availability have also increased. In assessing overall system and data availability it is advantageous to be able to quantify the impact of multiple simultaneous failures, especially those that are traced to common events, i.e., are correlated. In order to minimize the impact of failures on data availability, several protection mechanisms, or combinations thereof, can be employed, including data replication, erasure codes, etc. Deployment and operation of these protection mechanisms incurs additional costs, such as software licensing, storage and networking hardware, communication bandwidth, additional computation cost, etc.

Currently employed solutions replicate data either on nodes that are geographically close to the source of the data (for example within the same LAN, data center, or building site) or on remote, geographically diverse sites. The use of replicas in close proximity to the data source results in low communication replication cost but does not provide the required geographic diversity to survive catastrophic failures that may affect a larger geographic area. Conversely, while replication on remote sites may provide higher resiliency to catastrophes, large distances between data storage locations result in high cost (such as equipment, infrastructure, and communication).

The term "distance," with reference to node relationships, can refer to a conventional geographic separation between nodes, or to a more general definition of the relationship between nodes. This relationship encompasses factors such as compatibility and similarity between software, operating systems, networks, and more. Specifically, dissimilar operating systems are said to have a greater distance than similar operating systems. For instance, two nodes operating under a Windows operating system are more likely to suffer from the same system failure as would be a node operating under Windows and a second node operating under LINUX, with all other factors being equal.

Several theoretic solutions for increasing system availability, e.g., in the context of survivable storage systems, have been proposed. These include threshold schemes, such as Information Dispersal, Secret Sharing [A. Shamir, "How to share a secret", *Comm. ACM*, Vol. 22, pp. 612-613, November 1979], Read-Solomon Codes [A tutorial on Reed-Solomon coding for fault-tolerance in RAID-like systems"—J. S. Plank—Software Practice and Experience, Volume 27, Issue 9, Pages 995-1012 1997], and Tornado codes [John W. Nyers, Michael Luby and Michael Mitzenmacher, "Accessing Multiple Mirror Sites in Parallel: Using Tornado Codes to Speed up Downloads", *In proceedings of IEEE INFOCOM* 1999, New York, N.Y.]. A common approach of these systems is to segment data into n pieces, of which any m can recover the data. By distributing the n pieces on different nodes, the system is able to survive failures of up to (n−m) nodes. Often the motivation for these systems is to survive denial of service (DOS) attacks, or intruders compromising individual systems. Typically these systems are designed assuming that each node can fail independently; this assumption underestimates the probability that multiple nodes will fail together and thus result in loss of data. Other known methods for providing failure resiliency also assume independent failures or ad-hoc schemes for preventing the impact of both independent and correlated failures. Among them are peer-to-peer systems [I. Stoic, R. Morris, D. Karger, M. F. Kaashoek, and H. Balakrishnan, "Chord: A Scalable Peer-to-Peer Lookup Service for Internet Applications", *In Proceedings of SIGCOMM* 2001, San Diego, Calif. and S. Iyer, A. Rowstron and P. Drischel, "SQUIRREL: A Decentralized, Peer-to-Peer Web Cache", PODCS 2002] that replicate content across multiple (peer) nodes. However, the peer selection is essentially randomized, without any consideration for the properties such as geographic distance, communication cost or delay between different nodes. The nodes where data replication is performed could be located very far away (e.g., across different countries or continents). So, while selection of a random set of nodes to replicate data using these methods could be used to preserve data in the event of catastrophic events, it is likely to incur very high communication costs and delays, and thus is not a dependably efficient method of replicating data.

Existing solutions for achieving data availability do not jointly consider resiliency and replication cost. What is needed is a solution that achieves desired levels of data availability in failure recovery while considering jointly the resiliency requirements and replication costs.

SUMMARY OF THE INVENTION

Briefly, in accordance with the present invention, disclosed is a computer-implemented method for selecting at least one replication node from a plurality of eligible nodes in a network. The method includes constructing a multidimensional model that defines a multidimensional space, where the multidimensional model includes the eligible nodes, and each of the dimensions of the multidimensional model is a system characteristic. Next, a data availability value is determined for each of the eligible nodes and a cost of deploying each of at least two availability strategies to the eligible nodes is also determined. At least one of the eligible nodes for replication of data that is stored on a source node in the network is selected. The selecting is performed by finding an eligible node whose data availability value is the highest among the eligible nodes whose cost of deploying does not exceed a specified maximum cost, or whose cost of deploying is determined to be lowest among the eligible nodes whose data availability value does not exceed a specified minimum data availability value.

In accordance with an added feature of the invention, determining a data availability value includes determining a distance value for each of the eligible nodes and determining a probability of an independent failure of each of the eligible nodes, where the determination of the data availability value for each of the eligible nodes is based on the determined distance value and the determined probability of an independent failure for that eligible node.

In accordance with yet another feature of the invention, determining a data availability value further includes determining a probability of a correlated failure for combinations of the eligible nodes, where the determination of the data availability value for each of the eligible nodes is also based on the determined probability of a correlated failure for that eligible node.

In accordance with yet a further feature of the invention, the eligible nodes comprise geographically distributed data storage entities.

In accordance with yet an added feature of the invention, the system characteristics comprise at least three of a geographic location, an administrative domain, a hardware type, a hardware version, an operating system type, an operating system version, a network type, and a network service provider.

In accordance with yet another added feature of the invention, the cost of deploying comprises at least one of a data transfer cost and a hardware cost.

In accordance with yet an additional feature of the invention, the data located on the source node is replicated on the at least one eligible node that was selected.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
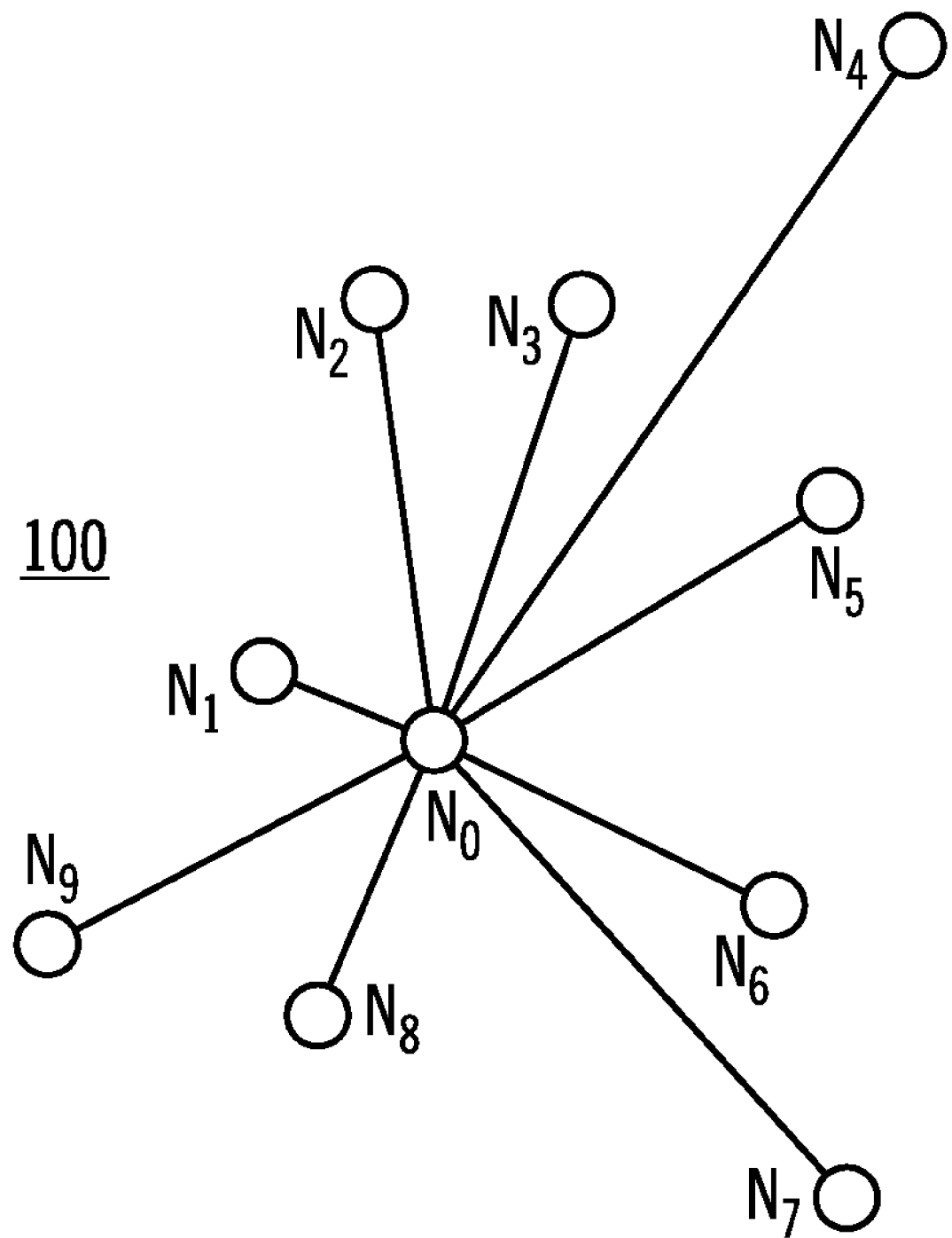
FIG. 1 is a diagram illustrating a network of nodes interconnected by pairs of bi-directional communication links according to one embodiment of the present invention.

It should be understood that the embodiments described below are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

Embodiments of the present invention provide systems and methods that can be used to assess the impact of multiple types of potential failures on data availability, given a specific type of protection mechanism and, furthermore, determine the optimal set of nodes where the protection mechanism is to be deployed. Embodiments of the present invention explicitly consider a trade-off between higher resiliency and higher prevention cost, which is the cost incurred when deploying (additional) protection mechanisms. In one embodiment, optimality is defined as maximizing system availability subject to prevention cost constraints or, alternatively, minimizing prevention cost subject to a lower bound on system availability. The optimal placement of data on different system nodes is determined based on the cost structure, failure models, and statistics and availability requirements.

Described now is an exemplary embodiment of the present invention. FIG. 1 shows a network 100 of nodes $N_0$-$N_9$, each interconnected by bi-directional communication links. In the example shown, node $N_0$ is the "source" node and nodes $N_1$-$N_9$ are destination nodes, which are also known as "candidate replication" nodes that are communicatively coupled to the source node $N_0$, i.e., nodes that are candidates for replicating data from node $N_0$. In further embodiments, the number of candidate replication nodes can be any number. Multi-node network 100 is asymmetrical and manifests different communication parameters. Specifically, different data path lengths exist between certain source and destination nodes. Data path lengths may be calculated as a physical distance and/or an electrical distance. For instance, two nodes can be in the same room; however the distance an electrical signal must travel to reach from one to the other may be enormous. In addition to path lengths, the connection from one node to another may vary in the number of switches in the electrical pathway, each having an inherent delay associated with it. Furthermore, a bandwidth, or electrical signal carrying capacity, may vary from node to node. Furthermore, the cost of establishing a connection to a candidate replication node via a service provider may vary from node to node.

Figure 2:
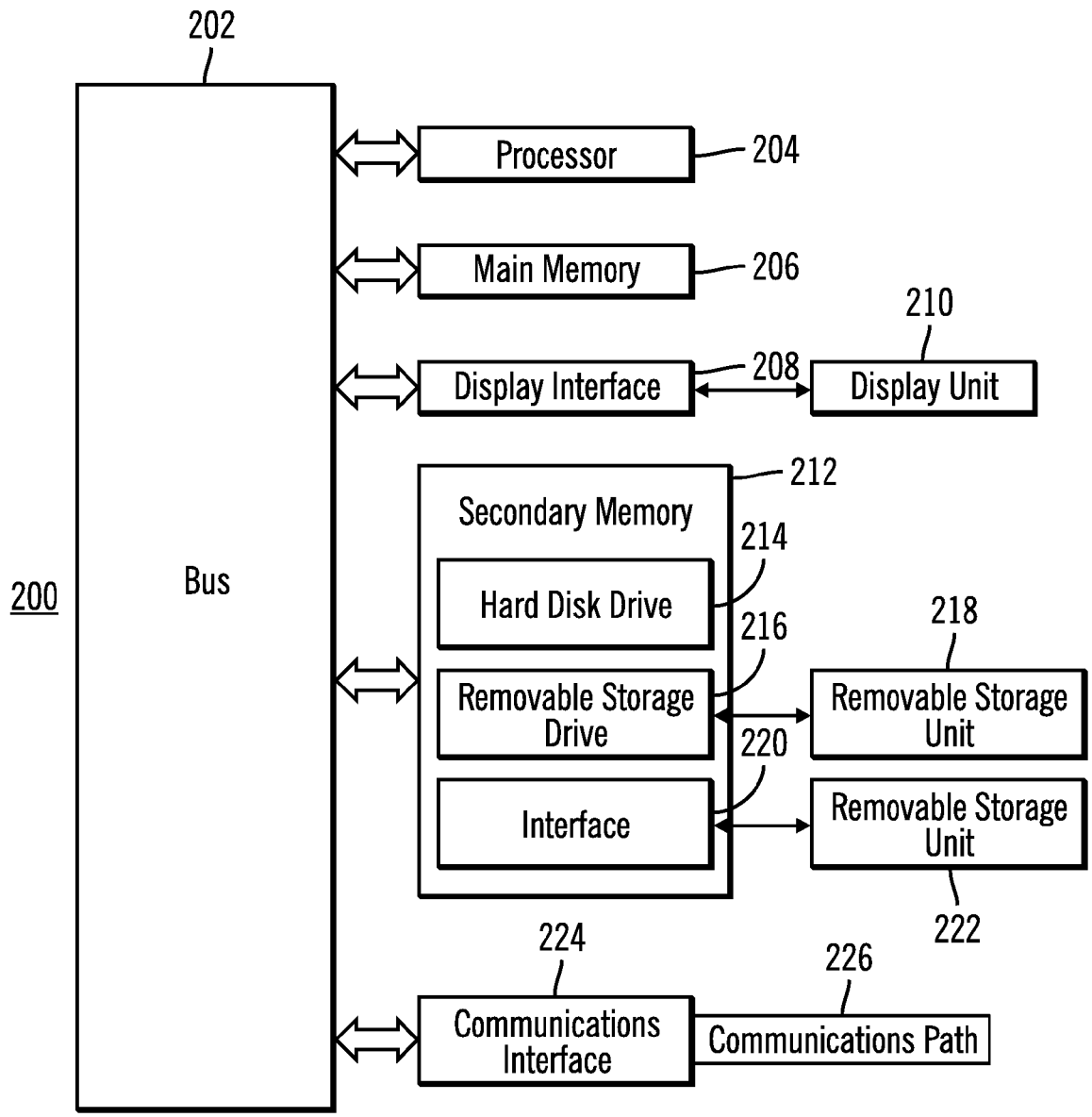
FIG. 2 is a high-level block diagram showing an exemplary node of FIG. 1.

FIG. 2 is a high-level block diagram showing an exemplary node 200. The node includes one or more processors, such as processor 204. The processor 204 is connected to a communication infrastructure 202 (e.g., a communications bus, cross-over bar, or network) which provides the ability for the node 200 to communicate with a plurality of other nodes. The present invention provides a computer-implemented method of selecting data backup schemes, with processor 204 processing the instructions for carrying out the method. After reading this description, it will become apparent to a person of ordinary skill in the relevant art(s) how to implement the invention using other nodes, computer systems, and/or computer architectures.

The node 200 includes a display interface 208 that forwards graphics, text, and other data from the communication infrastructure 202 (or from a frame buffer) for display on a display unit 210. The node also includes a main memory 206, preferably random access memory (RAM), and also includes a secondary memory 212. The secondary memory 212 includes, for example, a hard disk drive 214 and/or a removable storage drive 216, representing a floppy disk drive, a magnetic tape drive, an optical disk drive, etc. The removable storage drive 216 reads from and/or writes to a removable storage unit 218 in a well known manner. Removable storage unit 218 represents a floppy disk, a compact disc, magnetic tape, optical disk, etc., which is read from and written to by removable storage drive 216. As will be appreciated, the removable storage unit 218 includes a computer readable medium having stored therein computer software and/or data.

In alternative embodiments, the secondary memory 212 includes other similar means for allowing computer programs or other instructions and data to be loaded into the computer system. Such means include, for example, a removable storage unit 222 and an interface 220. Examples of such include a program cartridge and cartridge interface (such as that found in video game devices), a removable memory chip (such as an EPROM, or PROM) and associated socket, and other removable storage units 222 and interfaces 220 which allow software and data to be transferred from the removable storage unit 222 to the computer system.

The node also includes a communications interface 224. Communications interface 224 allows software and data to be transferred between the node and other nodes on a network or to external devices. Examples of communications interface 224 include a modem, a network interface (such as an Ethernet card), a communications port, a PCMCIA slot and card, etc. Software and data transferred via communications interface 224 are in the form of signals which may be electronic, electromagnetic, optical, or other signals capable of being received by communications interface 224. These signals are provided to communications interface 224 via a communications path (i.e., channel) 226. This channel 226 carries signals and may be implemented using wire or cable, fiber optics, a phone line, a cellular phone link, an RF link, and/or other communications channels.

In embodiments of the present invention, the source node replicates its data on a subset of destination nodes for resiliency purposes. For each destination node, a set of geographic coordinates are known and are obtained from, for instance, a location service, such as GPS, or estimated using delay-based network measurements such as Global Network Positioning [GNP], or other available methods. If a set of geographic coordinates cannot be obtained, a set of distances between the nodes can be used. The nodes can be distributed across a large geographic area. Additionally, a set of other node characteristics, relevant to the probability of joint failures are known or discovered. Such characteristics may include the node operating system(s) and version, administrative domain (enterprise owning/operating the node), internet service provider providing connectivity to/from the node, country where the node is physically located, etc.

Embodiments of the present invention allow the source node $N_0$ to determine an optimum set of nodes for the placement of data as part of a data resiliency strategy. Alternatively, the optimum set of nodes may be determined by a central node, collecting information about all other nodes and determining the optimal deployment of the resiliency strategy and placement of data. In one embodiment of the present invention, optimality is determined by factoring the probability of data being available at any time among a subset (one or more) of the candidate nodes and minimized (or reduced) replication cost. Replication cost can be defined in a variety of ways, depending on the particular disaster recovery policy and cost structure. It may include communication cost, which is a function of the distance between the source node and its replicating nodes, storage cost, infrastructure cost, software deployment and management cost, etc. Communication cost can be given by any function that increases with the number of nodes, the distance of these nodes from the source node $N_0$ and the amount of data transferred. Availability is expressed as the probability that at any time the data survives failures. For resiliency strategies based on data replication only this is equivalent to having at least one node, among the nodes replicating the data, survive at any time. For resiliency strategies based on replication, availability is expressed as the probability that a subset of nodes sufficient to reconstruct the data survives at any time.

Exemplary causes of concurrent failures that cause both the source node and one or more of the candidate replication nodes to become simultaneously unavailable are extreme weather and environmental phenomena, such as tornadoes, hurricanes, earthquakes, tsunamis, etc., destructive catastrophic events, such as acts of terrorism or accidents, network failures, computer viruses, power failures, and other similar causes.

Figure 3:
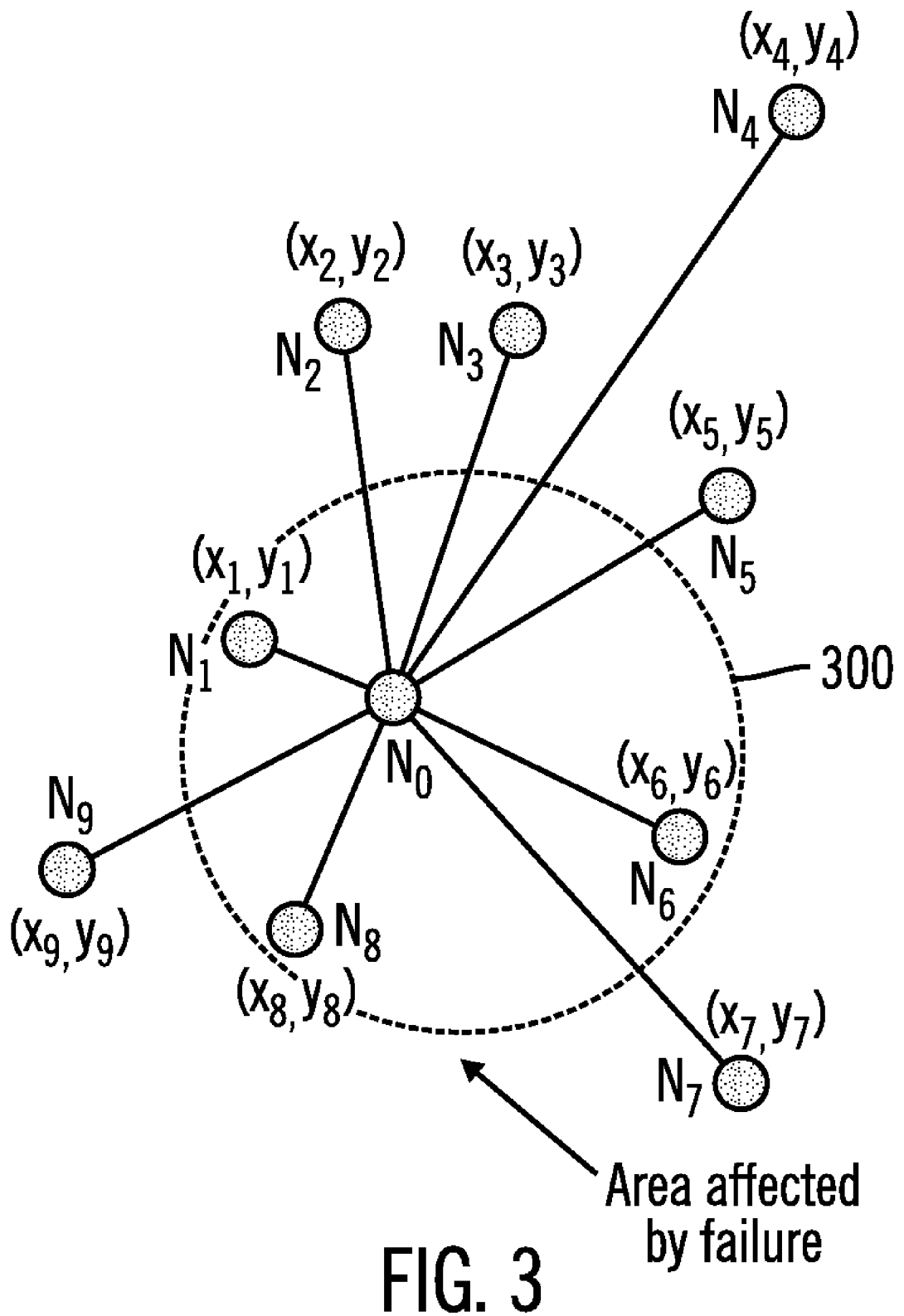
FIG. 3 is a diagram showing the network of FIG. 1 after suffering an exemplary concurrent failure of multiple nodes.

As an example of availability, FIG. 3 shows the network of FIG. 1 after it has suffered an exemplary concurrent failure 300, which in the example impacts nodes within a circular area. The failure 300 impacts the set of nodes $N_0$, $N_1$, $N_6$ and $N_8$ and renders them unusable. If data has been replicated in any or several of the remaining nodes $N_2$-$N_5$, $N_7$, or $N_9$, the data can be recovered and the effects of the catastrophic failure are reduced.

Figure 4:
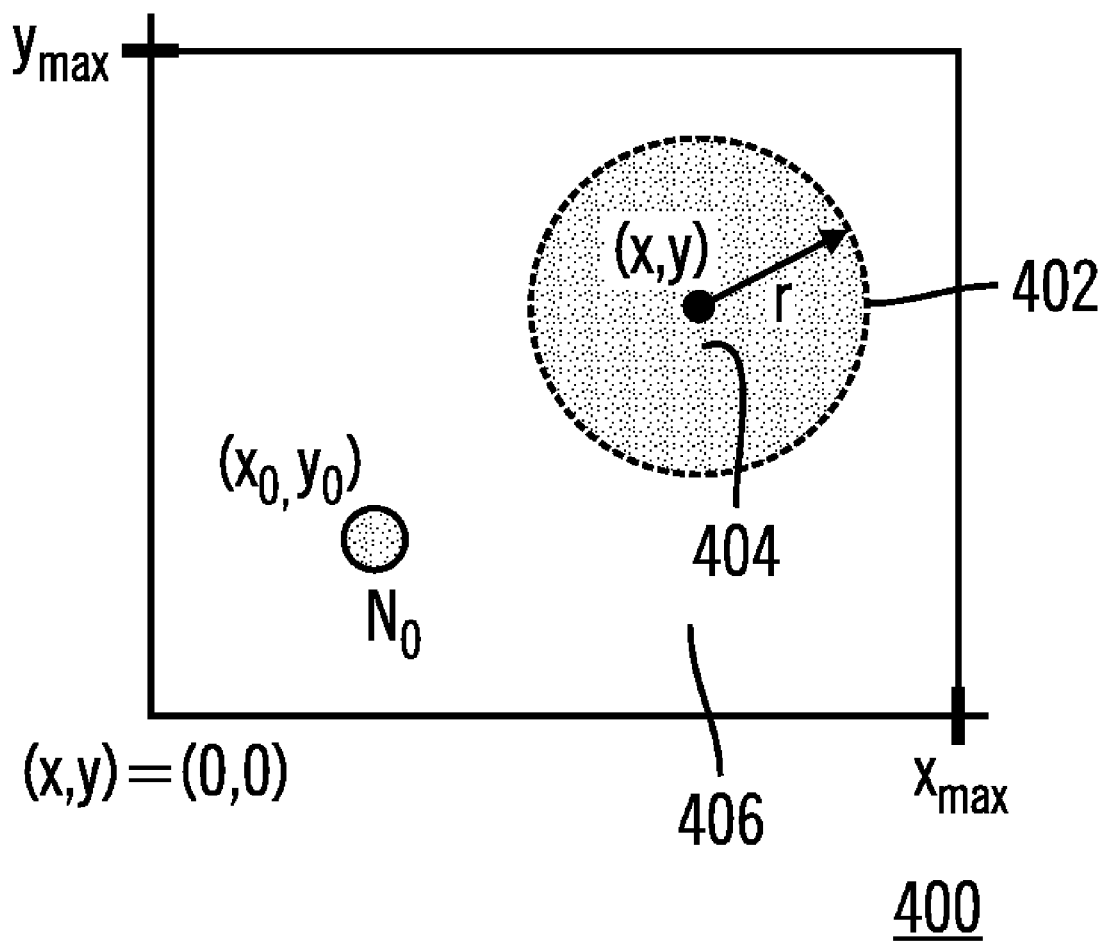
FIG. 4 is a diagram illustrating a correlated failure model according to an embodiment of the present invention.

Preferred embodiments of the present invention construct a model of correlated failures to compute this probability. The model uses historical data as well as predictive mathematical models. In one exemplary embodiment of the present invention shown in FIG. 4, a correlated failure model 400 assumes that a failure impacts a set of nodes within a circle 402, and uniformly distributed within the interior 404 of the circle 402, which is within a 2-dimensional plane 406. The radius of the circle 402 follows an exponential distribution that may or may not affect the source node $N_0$. In another exemplary embodiment, a correlated failure model 400 assumes that a failure impacts a set of nodes within a circle 402, the interior of which is distributed within a 2-dimensional plane with a distribution that is obtained from historical data, including but not limited to, earthquake frequency maps, hurricane frequency maps, flood zone maps, snow-storm frequency maps as well as a combination thereof, and the radius of which is also obtained from an exponential distribution for which the rate is obtained from the previously mentioned maps. Preferred embodiments of the present invention also construct a model of the combination of independent and correlated failures to compute this probability.

For example, the model of the combination of independent and correlated failures to compute the failure probability can be constructed as follows. The model assumes that failures happen in time and that time is slotted. The length of a time slot is defined so that the probability that in each time slot, the probability that one correlated fault occurs is $P_{corr}$ and the probability that more than one such fault occurs within a single timeslot is negligible. As described above, $P_{corr}$ can be computed from historical data as well as predictive mathematical models. It is assumed that the center of the fault event is distributed according to a uniform random distribution over a circular fault field with radius R on the 2-dimensional plane. For simplicity of presentation, we use the center of the circular fault field as the origin of the 2-dimension space and adjust all coordinates accordingly. To characterize the phenomenon that fault events affecting large geographic areas are much rarer than those affecting small geographic areas, we assume the impact of a fault event is exponentially decaying: the impact reaches as far as a distance r from the center of the fault, where r is random and exponentially distributed with parameter c; when a fault happens, all nodes within a radius of r to the center of the fault fail simultaneously.

When a fault event occurs at center v, all nodes in a set S will fail due to this correlated fault if and only if their maximum distance to v is equal or less than the radius of the fault. That is, the probability that they all fail due to this fault event is given by the following equation.

$$F_{corr}(S, u) = \int_{r=d(S,u)}^{+\infty} c e^{-cr} dr = e^{-c \cdot d(S,u)} \quad (1)$$

where d $(S,u)=\max_{N_i \in S} d(N_i, u)$. So if the probability of independent failures is zero, the probability that all nodes in S fail at the same time slot is the integral of equation (1) over all possible fault centers in the fault field, which is given by the following equation.

$$F_{corr}(S) = \frac{P_{corr}}{\pi R^2} \int_A F_{corr}(S, u) du \quad (2)$$

In the case that the center of the fault event is not distributed according to a uniform random distribution, but instead a distribution $P_{corr}(u)$, equation (2) is written as follows.

$$F_{corr}(S) = \int_u F_{corr}(S, u) P_{corr}(u) du \quad (3)$$

When both independent and correlated failures are possible, the failure of a set of nodes during the same time slot can be the result of various combinations of independent failures and correlated failures (e.g., part of the nodes in the set fail independently and the other nodes within the set fail due to a correlated failure.) To compute this probability, we first consider the conditional probability that all nodes in a set S fail in a time slot given that a fault has happened in that time slot with the fault center at u. To calculate this conditional probability, we consider separately the cases where the radius of the fault covers 1 node, 2 nodes, etc., or all nodes in S. Assume that the nodes in S have been sorted based on their distances from u and that they are denoted by $N_{i1}, N_{i2}, \ldots, N_{i|S|}$ in increasing order. In this case, we have the following.

$$F_{comb}(S) = Prob\{r \geq d(N_{i|S|}, u)\} + \sum_{s=1}^{|S|} Prob\{r \in [d(N_{i|s|-1}, u), d(N_{i|s|}, u)]\} \prod_{k=s}^{|S|} Prob\{N_{i_k} \text{ fails}\}$$

where we set $d(N_{i0}, v)=0$. Thus, we have the following equation.

$$F_{comb}(S, u) = e^{-c \cdot d(N_{i|S|}, u)} + \sum_{s=1}^{|S|} \left( e^{-c \cdot d(N_{i_S-1}, u)} - e^{-c \cdot d(N_{i_S}, u)} \right) P_{ind}^{|S|-s+1}$$

Therefore the probability that all nodes in S fail in the same time slot is given by the following equation.

$$F_{comb}(S) = (1 - P_{corr}) P_{ind}^{|S|} + \frac{P_{corr}}{\pi R^2} \int_u F_{comb}(S, u) du$$

This integral can be computed using numerical methods. The availability of data generated by a node $N_A$ in a time slot is thus defined as the probability that either $N_A$ or at least one of the nodes in its backup set $S_A$ survives the risk of both independent failures and geographically correlated failures through the time slot. That is, the availability is denoted by $A(N_A \cup S_A) = 1 - F_{comb}(N_A \cup S_A)$.

Replicating on a small set of nodes and/or nodes that are close to the source node incurs a low replication cost, but also suffers from low availability. Conversely, replicating on a large set of nodes and/or nodes that are geographically distributed—located far from the source node—incurs large replication cost but also achieves high availability. Embodiments of the present invention determine an optimal combination of replica nodes, in terms of number of nodes and their location. This is done by looking at a plurality of communication parameters to determine a communication cost. The parameters include data transfer factors such as physical distances, electrical path lengths and other electrical pathway factors between nodes. For instance, although a replication node may be physically separated a larger distance away from the source node than other available replication nodes, the electrical path length to that replication node may be the shortest, thus giving the pair the lowest communication cost. The parameters also include factors such as the cost of establishing a connection to a node via a service providers' network and the hardware factors, such as the cost of data storage capability on the node.

In addition to path lengths, the connection from one node to another may vary in the number of switches in the electrical pathway, each having an inherent delay associated with it. Furthermore, a bandwidth, or electrical signal carrying capacity, may vary from node to node. Also, a node's memory capacity for storing data can be a factor. If the node has only enough capacity to store a portion of the data, the cost of communicating the remaining data to other nodes should be factored into the overall communication cost.

The set of candidates can be very large and include any combination of nodes among the nodes reachable by the source node. Preferred embodiments of the present invention narrow the search space to determine the optimal set of replicating nodes by applying a "branch-and-bound" algorithm to deal with the combinatorial explosion among all possible node sets. This begins with an initial set of candidate nodes ($N_1, \ldots, N_k$), which can be derived arbitrarily, e.g., by limiting the maximum distance from the source node, or through some discovery/directory service. Each candidate set of nodes is examined against a requirement for the solution. In one embodiment of the present invention the requirement is to satisfy a given availability or probability that all data produced at a node will be available, for example 0.99999. In such an embodiment, the optimal set is the one that satisfies the availability requirement while exhibiting the lowest replication cost. In another embodiment of the present invention, the requirement from each set of candidate nodes is to have a replication cost below a certain budget. In this embodiment, the optimal set is the one that satisfies the budget requirement, while maximizing the availability. The "branch-and-bound" algorithm considers the possible sets of nodes as follows. First, it considers the solutions that include the singleton sets $\{N_1\}, \ldots, \{N_k\}$. For each solution, the availability and replication cost is computed. Other candidate nodes are added to each possible solution set, creating a new candidate set and expanding into a tree-like structure.

At each stage, the "branch-and-bound" algorithm considers whether the candidate sets satisfy the given requirements. In the embodiment where the requirement is to satisfy a given availability, if the availability of a given solution set satisfies the requirement no further expansion of this branch is needed, since the addition of another node will result in an unnecessary increase in cost. If a branch that does not satisfy availability has a higher communication cost than one that does, it is disregarded and not pursued further. When no further branches can be constructed, the lowest cost solution is selected from among the remaining solution sets that satisfy the availability requirement.

Figure 6:
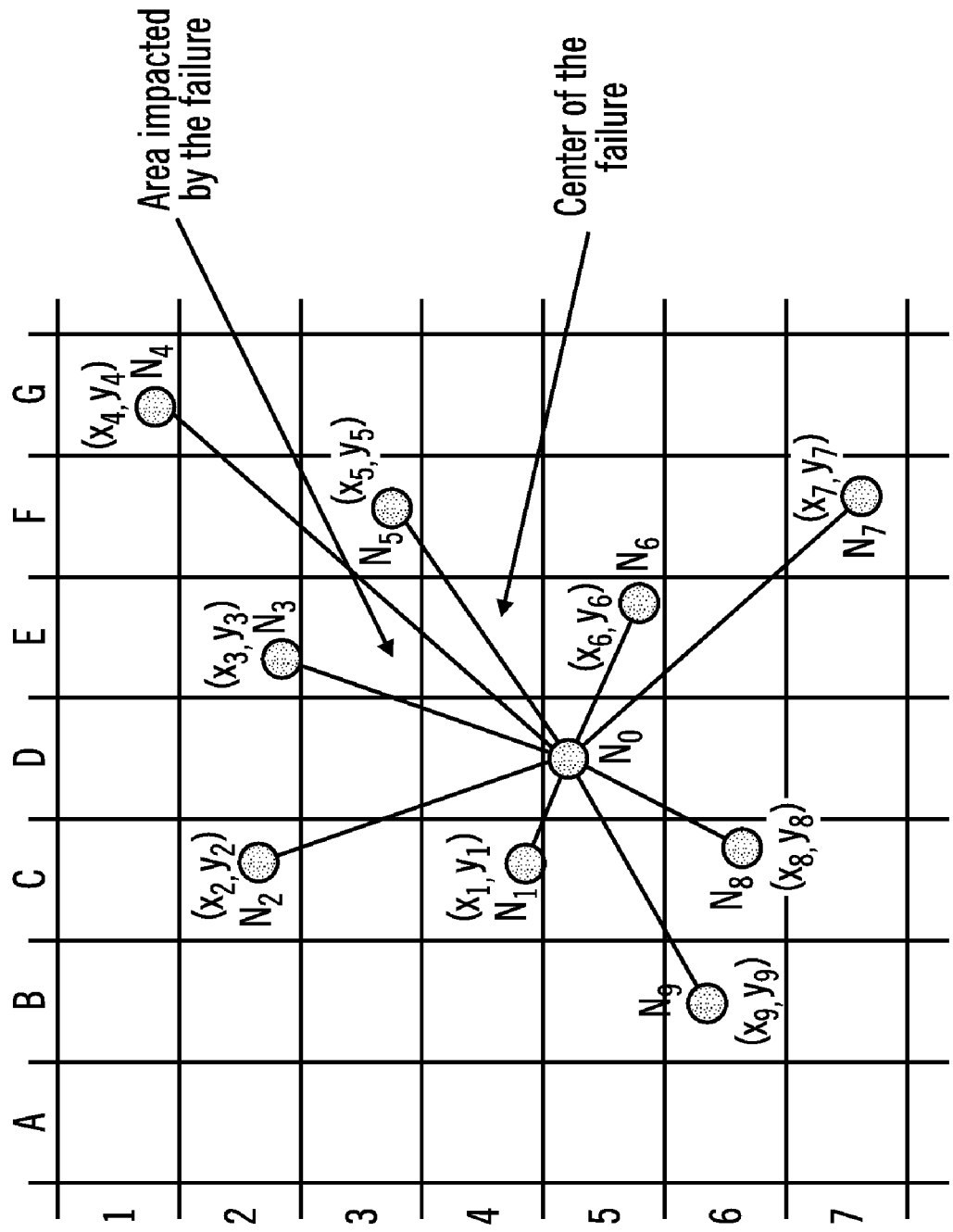
FIG. 6 is a diagram illustrating a failure distribution model according to an embodiment of the present invention.

The branch and bound algorithm of this embodiment can be expressed in pseudo-code as follows.

regions, each one of which includes one or more nodes. In this case, it can be assumed that a correlated failure will impact all nodes within on or more regions, i.e., if a node is affected then all nodes with the region of that node are also affected. The probability that two or more regions will fail simultaneously due to a correlated failure depends on the distance between the regions, measured in terms of the (discrete) number of regions between them. Similarly, the radius of a failure is given in a (discrete) number of regions affected from the center of the failure. The probability distribution for the radius may follow a geometric distribution, analogous to the exponential distribution in the continuous case discussed above. In the exemplary embodiment of FIG. 6, the 2-Dimensional plane is subdivided in a grid-like fashion, resulting in the rectangular regions identified in the figure. The x coordinates are labeled A-G and the y coordinates are labeled 1-7. In this example, the center of the failure is region E4, and the failure extends 1 region in all directions; thus, the regions affected by the failure are D3, E3, F3, D4, E4, F4, D5, E5 and F5.

Figure 5:
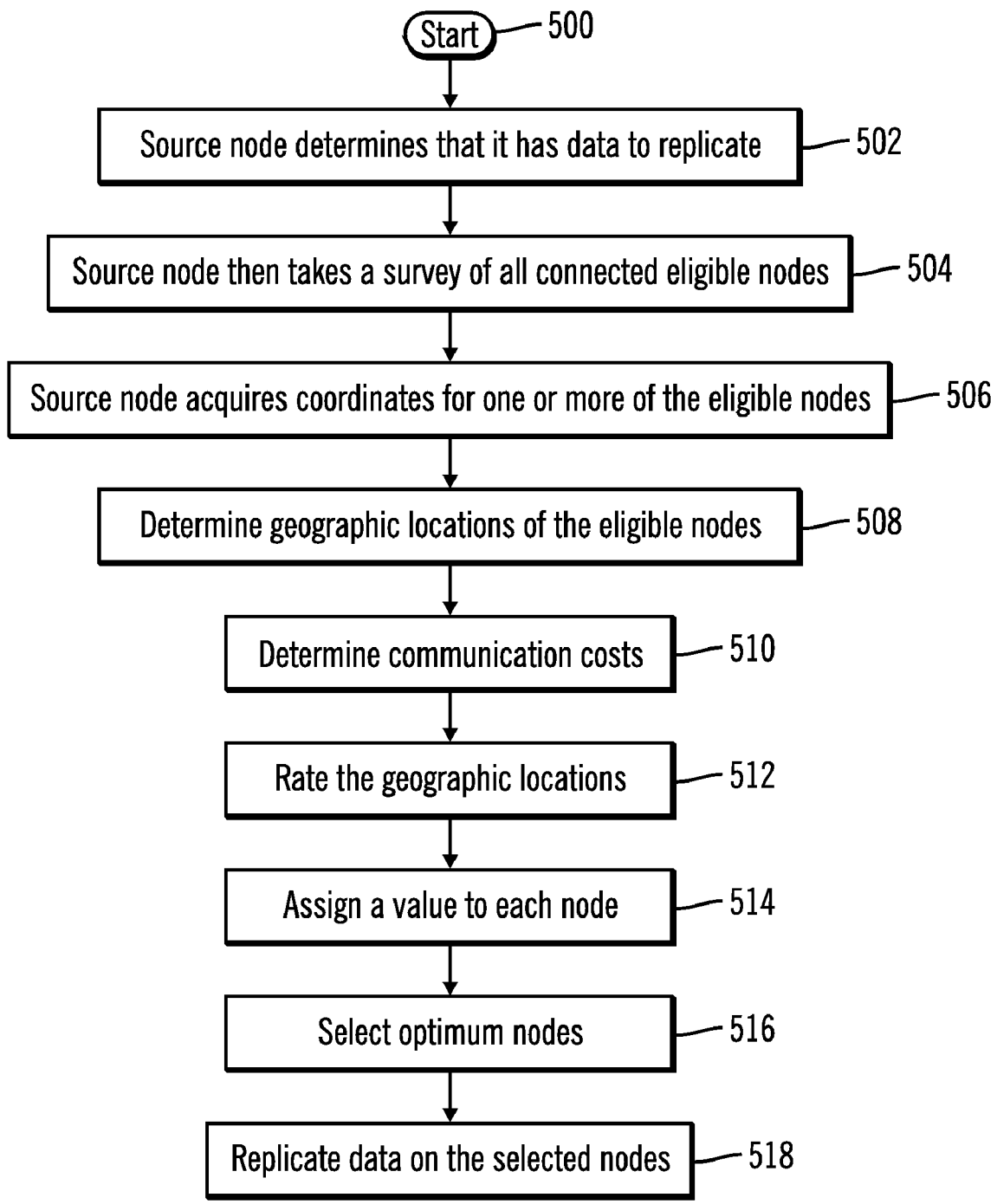
FIG. 5 is a flow diagram illustrating the steps for designating replication nodes according to one embodiment of the present invention.

FIG. 5 shows a process flow diagram for one embodiment of the present invention. The process begins at step 500 and moves directly to step 502 where a source node determines that it has data to replicate. The source node then takes a survey of all connected nodes to determine eligibility, in step 504. "Eligible," as used here, indicates functional, communicating nodes, with memory capacity to handle storage of at least a portion of the data intended for replication. After the eligible nodes are determined in step 504, the flow moves to step 506 where the source node acquires coordinates for, or distances to, one or more of the eligible nodes. In step 508, the coordinates are used to determine geographic locations of the eligible nodes. The coordinates or other means also allow the source node to determine communication costs associated with the required transmission distances to the other nodes. This determination is made in step 510. The geographic locations are then given ratings in step 512, the ratings being

```
1:  S_0 = {N_0}
2:  S_full = S_0 ∪ {N_1, N_2 ..., N_k}
3:  set the root of tree T to S_0
4:  let cost upper bound, C_u = +∞
5:  let S_optimal = null
6:  while T ≠ ø do
7:      randomly choose a tree-node S_curr from tree T
8:      if S_curr.cost ≧ C_u then
9:          delete from tree T the subtree rooted at S_curr
10:     else if S_curr.availability ≧ A_l then
11:         let C_u = S_curr.cost
12:         let S_optimal = S_curr
13:         delete from tree T all nodes whose costs are equal or greater then C_u
14:     else if S_curr is expandable then
15:         Branch out a new child S_new below S_curr in tree T, where S_new belongs to {S_curr ∪ {N_i} | N_i ∈
            S_full − S_curr}. Once S_curr has already branched out all its |S_full − S_curr| children, it is not
            expandable anymore.
16:     else if all S_curr's children have been deleted then
17:         delete S_curr from tree T
18:     end if
19: end while
20: Algorithm exits. If S_optimal is null, then there is no feasible backup set that can achieve availability
    A_l; otherwise, S_optimal − {N_0} is the optimal backup set.
```

In other embodiments, the system is extended to cover cases where the location of one or more nodes is not given by continuous coordinates in a multi-dimensional space, but by placement within a region or surface of the space. In this case the multidimensional space is sub-divided into a number of based on the probability of a catastrophic event affecting both the candidate node and the source node. The probability can be based on historical data, such as an area's previous history of hurricanes. As an example, the probability will be high if the source and the replication node are both in an area that is typically affected by hurricanes and especially an area that is affected by the same hurricanes.

In step 514, each node is assigned a value, based on a combination of communication cost and the geographic location of the candidate node. A selection is then made, in step 516, based on these assigned values. In step 518, the data is replicated on the selected node or nodes. In some embodiments, the nodes are constantly, or periodically, monitored to determine changing conditions or the availability of new nodes that are strategically better choices for replication.

A system and method that utilize a two-dimensional model for accurately selecting safe data backup locations has just been described. The present invention also provides other embodiments, where, in addition to natural and catastrophic disasters and distance between nodes, distance metrics between operating systems and networks are calculated in relation to correlated failures. To accurately and strategically select node backup schemes that factor additional elements, multidimensional models are implemented as described below.

Multidimensional Failure Dependency Model

Embodiments of the present invention, as will now be described, can be used in modeling and system design for protection against the impact of correlated failures of multiple types, as well as combinations of correlated and independent failures. In one embodiment, the present invention optimizes system availability and cost against multiple types of failures, such as hardware and/or software failures, power interruptions, natural disasters, catastrophic events, terrorist attacks, and more. These failures are generally classified into two main categories: independent and correlated.

Independent failures are those that cause a single node failure, for reasons unique to that node and without any further impact on other nodes. They include, for example, node-specific hardware and/or software failures.

Correlated failures are caused by events impacting a set of one or more nodes simultaneously. Multiple types of faults fall within this description. They include geographically correlated failures, such as those caused by power-outages, weather and environmental phenomena (e.g., hurricanes and earthquakes), catastrophic events (e.g., terrorist attacks and military actions), network correlated failures (e.g., routing protocol failures, DOS attacks causing congestion, worms, and viruses), and others.

In this exemplary embodiment, the present invention constructs a multidimensional model for estimating the probability of different combinations of nodes failing simultaneously due to various combinations of independent and correlated failures. Each dimension of the model represents a particular system characteristic. A cost function is then incorporated that captures the cost of deploying a particular availability strategy, such as data replication, coding, etc. This cost function includes multiple components, such as the cost of using a node, the communication cost of transferring data, the cost of deploying additional software or hardware to perform data processing or format conversions, costs related to crossing different administrative boundaries, and more. An optimization algorithm is then applied to reduce the search space and compute the strategy that maximizes data availability, subject to an upper bound on the cost, or, alternatively, that minimizes cost subject to a lower bound requirement on the data availability.

More specifically, the multidimensional model includes at least three dimensions. Each of the dimensions of this model corresponds to one relevant system characteristic, such as its geographic location, administrative domain, hardware version, hardware type, operating system type and version, network type and provider, etc. System characteristics can be any hardware, software, or performance aspect of a network.

Figure 7:
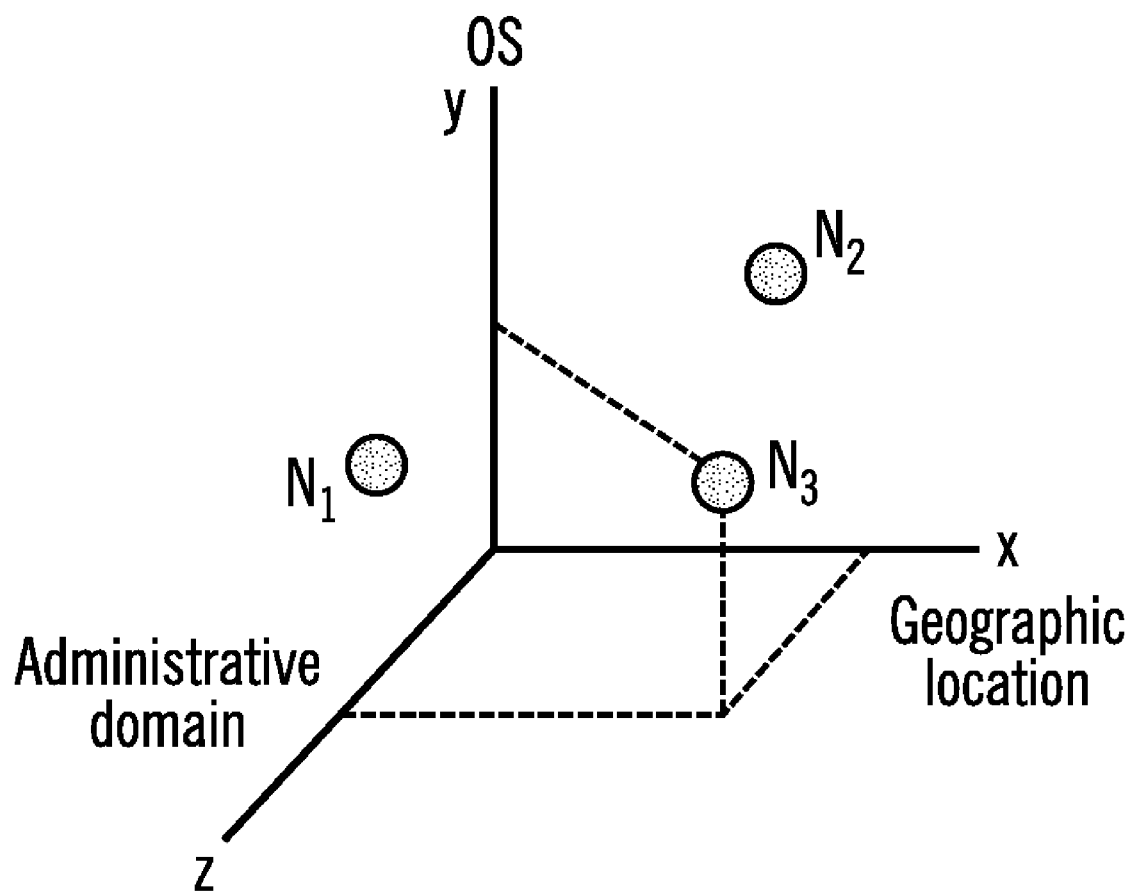
FIG. 7 is a diagram illustrating a multidimensional model of nodes in a network according to one embodiment of the present invention.

FIG. 7 shows an exemplary multidimensional model with 3 dimensions—x, y, and z—corresponding to the geographic location, operating system type, and administrative domain, respectively. The present invention is not limited, however, to three dimensions. Each system node $N_1$, $N_2$, and $N_3$ shown in FIG. 7 corresponds to a point in the multidimensional space.

A distance metric is defined in each of these dimensions. Dimensions take continuous values (e.g., geographic location) and, hence, a distance metric can be defined in a straightforward manner, for example a Euclidean distance. Other dimensions, such as operating system type or network service provider, relate at least partially to compatibility and are given categorical values. The process of defining a distance metric in these dimensions is more involved. A number of different approaches, or combinations thereof, can be employed to define a metric in such dimensions. Exemplary approaches include the following.

(1) Metrics based on a-priori knowledge and/or statistical observations of failure events among nodes with different categorical values. For example, in the y dimension, corresponding to the category of Operating System, it can reasonably be assumed that the "distance" between two Microsoft Windows operating systems is smaller than the distance between either of them and a Linux variant. For example, a "distance" between Windows XP and Windows 2000 is less than a "distance" between Windows XP and Linux. Such metrics may require a statistically significant number of prior observations of failure events, for example, system failures due to virus infection, system conflicts, bugs, and other causes.

(2) Learning-based methods that start with a-priori distance definitions and refine them through on-line learning, or other methods, using observations of failure correlations. Multi-dimensional clustering techniques may be used to determine which semantic values are closer in failure correlation proximity.

(3) Categorical values may be mapped to a set of discrete values on which a Euclidean distance metric is defined. The mapping may be determined using either of the previous two approaches.

Next, a distance metric between points in the multi-dimensional space is defined, taking into account the metrics in each dimension. Intuitively, the shorter the distance between two nodes, the higher the failure correlation is between these nodes. A metric capturing the probability of nodes failing simultaneously is then defined. Again, the shorter the distance between two points, the more likely the two nodes are to fail together. This metric is derived using a combination of the following.

(1) Observed joint failure probabilities, for example, those servers that have been simultaneously affected during previous virus or other system failure incidents.

(2) Long-term historical statistics regarding failure-causing events, for example, probability distributions for earthquake epicenters and magnitude, or probability distributions for the location and magnitude of a power outage. This probability metric defines the probability that all points within a given area, such as a sphere, in the multidimensional space will fail simultaneously.

(3) A-priori knowledge about connectivity and administrative boundaries. For example, identifying nodes that share Internet access or belong to the same administrative domain.

Cost Function

Embodiments of the present invention utilize a cost function that captures the various cost components of deploying a candidate availability strategy. That is to say, each strategy used for backing up data, changes, or has the potential to change, the system metrics. A wide range of metrics can be incorporated into the cost function, such as communication cost for transferring/copying data between nodes, storage cost for storing additional data across different system nodes, software deployment and management cost for data processing and format conversion, computational cost for data processing, and increased hardware cost for deployment of additional system nodes.

Typically the cost function is increasing, for all other parameters being fixed, in the number of system nodes and geographical distance between nodes involved. For example, in a data replication strategy the cost increases with the number of replicas and the distance between the source and the replicas (the increase may be linear, quadratic, etc.).

The cost value assigned to each factor can be fully or partially automatically generated by, for instance, a cost-assigning computer system. The cost values can also be fully or partially assigned manually, based on an evaluation of the multiple factors listed above, or others. The exact method of assigning the cost values is unimportant. Embodiments of the present invention are advantageous in that they calculate a node backup scheme by utilizing whatever values have been assigned by whatever assignment process is used. Inaccurate cost values may effect the final backup scheme, but do not affect the accuracy of determining the optimum backup scheme based on the values provided.

High-Availability System Optimization

Given the failure model and cost function, embodiments of the present invention utilize an optimization mechanism to efficiently search the space of possible candidate high-availability configurations. The system can be configured to search in multiple modes to optimize a given set of criteria. In one embodiment, the system searches in one of two modes: (1) find the configuration with highest availability given an upper bound on cost, or (2) find the lowest cost configuration given a lower bound on system availability. In both cases the system handles a very large number of possible combinations. It uses combinatorial optimization to reduce the search space. In particular it uses monotonicity properties, such as the assumption that the addition of a system node in an availability policy increases the total cost.

Heuristics Based on Computational Geometry

Embodiments of the present invention also use heuristics based on computational geometry; in particular, subsets of system nodes that belong to sub-spaces of the multi-dimensional model are considered. In two dimensions, these subspaces are defined by the Minimum Enclosing Circle (MEC). The MEC is a set of points that approximate the resiliency of the corresponding set of nodes. Intuitively, for the same number of nodes, a set with a smaller MEC should be less resilient to correlated failures than one with a larger MEC. The concept of MEC generalizes to multiple dimensions as a Minimum Enclosing (multi-dimensional) Sphere. The optimization algorithm searches for the maximum circle defined by n points, where n=2, 3, . . . . It then finds the maximum circle (or sphere) among all 2-, 3-, . . . node combinations. It progressively deletes high-cost nodes within a MEC if they do not result in a reduction of the MEC. The end result is a reduction in the complexity of computing the multi-step conditional probabilities of failure.

An application of the invention is demonstrated by using the example system shown in FIG. 7. Each node is characterized by its geographic location and operating system. Geographic location is represented in a 2-dimensional space, resulting in two parameters (x, y) and operating system is a categorical parameter. The distance in the operating system axis is embedded into a Euclidean distance metric, as described below. The system is subject to 3 different types of failures; including:

Failures caused by earthquake activity: these are geographically correlated failures, characterized by the distribution of the center of the failure and, for each center the distribution of the size of the fault area. We assume these two parameters are given by a map, such as an earthquake probability and size map.

Failures given by hurricane activity: these are also geographically correlated failures and are characterized by the same parameters as earthquake faults; distribution of the center and distribution of the size of the area impacted. These parameters are provided in readily available maps.

Failures correlated by the operation system type: these could be due to virus attacks, faults, etc. For these types of failures, what is given is the characterization of the probability that two systems will fail together given the "distance" between their operating systems. This metric is provided by virus propagation models (add reference).

Figure 9:
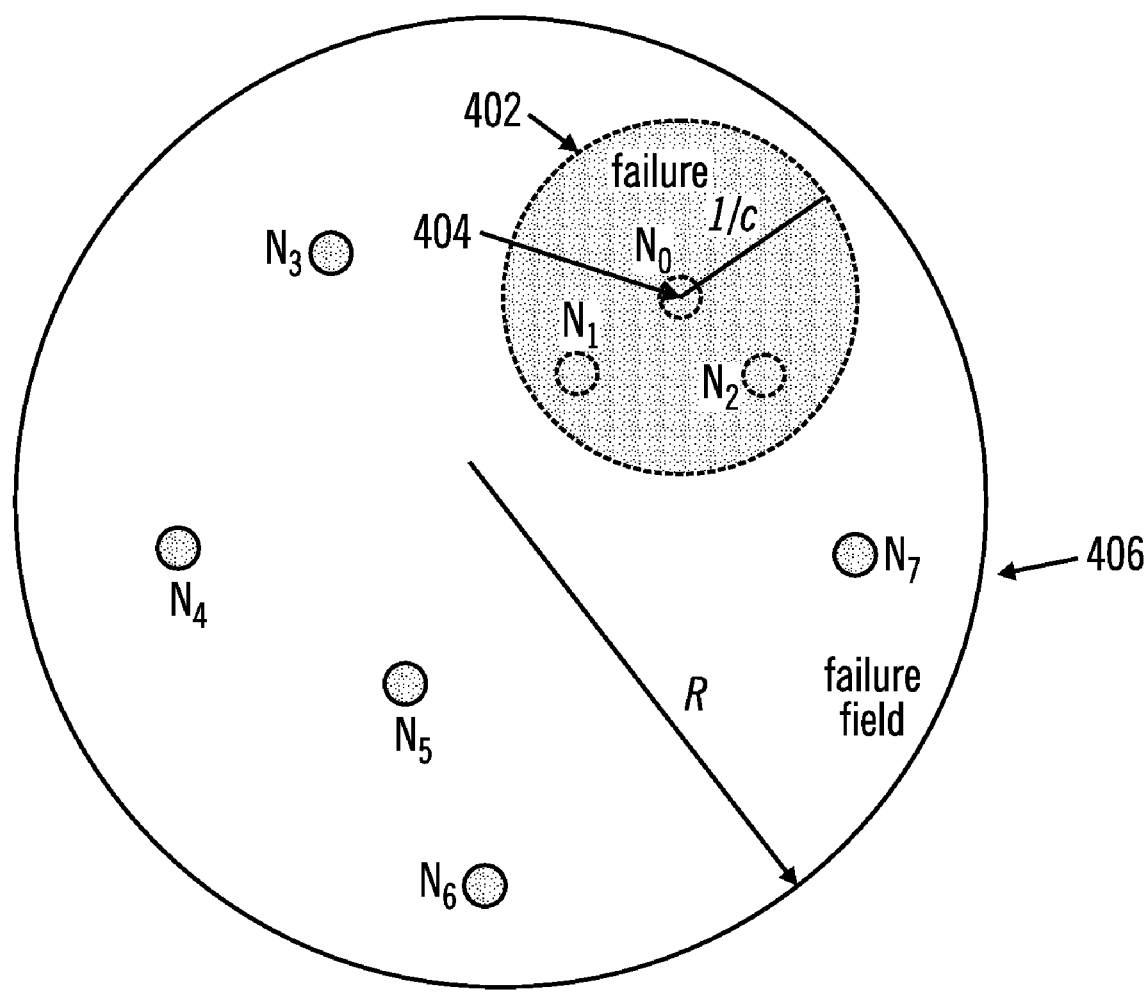
FIG. 9 is a diagram illustrating a multidimensional model of nodes in a network according to one embodiment of the present invention.

It is assumed that an enterprise has a number of locations on which data may be replicated, as shown in FIG. 9. There is a cost to replicate data among a pair of locations, given by the physical distance between the locations as well as the distance between the operating systems. The later part of the cost function depends on the type of software and associated licenses that may have to be deployed on different operating systems in order to allow the replication.

As an example, one may encounter a problem of determining where data generated in location N0 (in northern California) is to be replicated in order to achieve a certain level of availability, say 99.9999%. The present invention starts by considering the location N0 itself and considers if, given the 3 failure models, the failure probability satisfies the availability target. If not, it expands by adding the "closest" eligible node, N2, as per the sequence of steps described in FIG. 5. These steps identify the closest in terms of cost from N0 that is eligible for replicating the data from N0. Eligibility is determined using criteria such as, but not limited to, software compatibility, storage availability, trust relationship, etc. the set of nodes containing the data is now {N0, N2}. Assume that the addition of N2 improves the availability, but not sufficiently to reach the target. In the next step the algorithm adds node N3; however, given that this node is likely to fail at the same time as N0, it still does not meet the failure probability requirement, so another node need to be added, let's assume the next one is N7. The new set {N0, N2, N3, N7} now satisfies the requirement. The algorithm also expands the set {N0, N2} with N7, resulting in a set that satisfies the requirement, {N0, N2, N7} and having less cost than {N0, N2, N3, N7}. Eventually {N0, N2, N7} becomes the lowest cost set that satisfies the requirement. In each step the probability that all nodes in the replication set fail simultaneously is computed using the equation:

$$F_{comb}(S) = (1 - P_{corr})P_{ind}^{|S|} + \frac{P_{corr}}{\pi R^2} \int_u F_{comb}(S, u)\, du$$

System Realization

Figure 8:
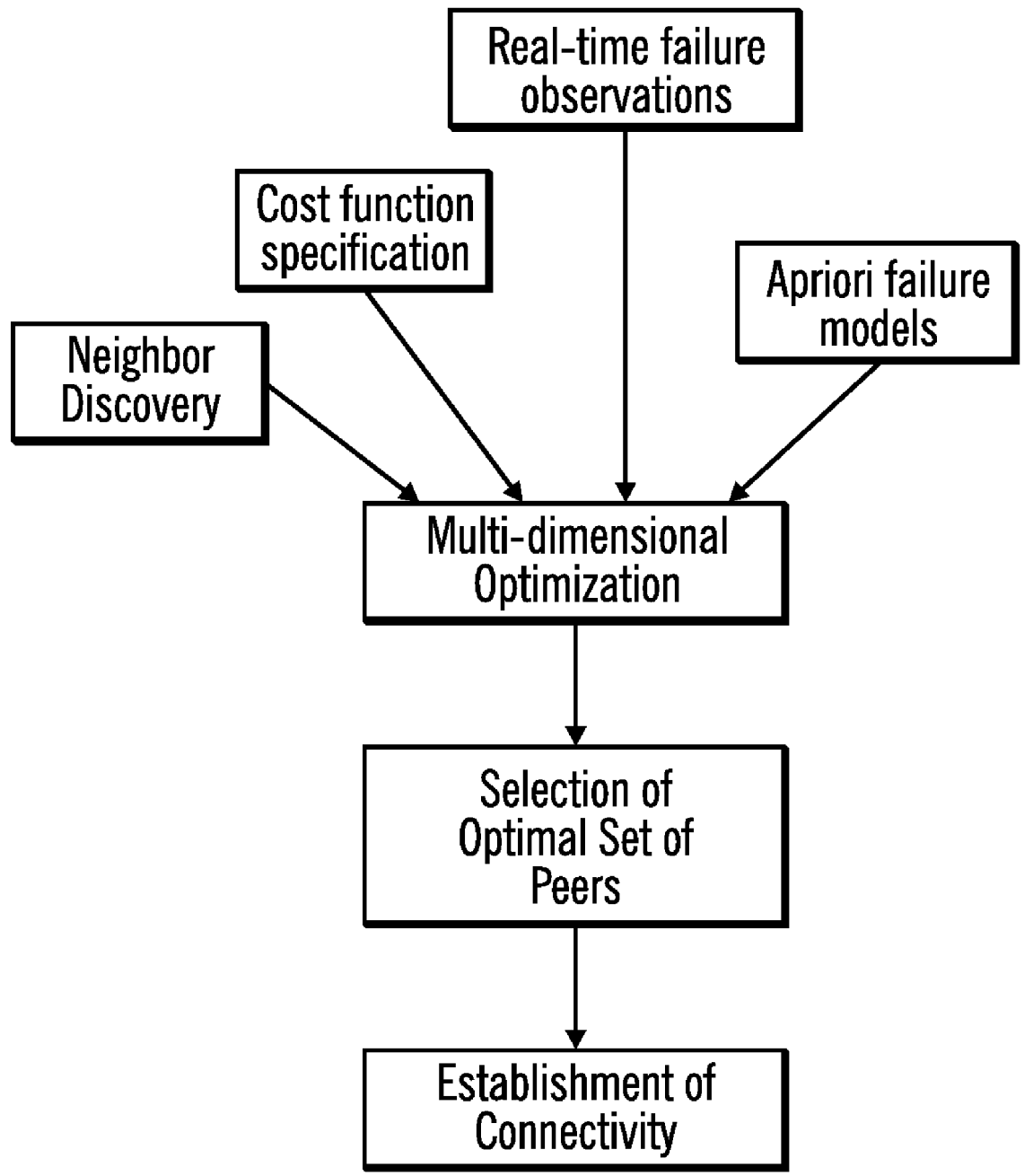
FIG. 8 is a flow diagram illustrating the steps for designating replication nodes according to another embodiment of the present invention.

FIGS. 1 and 8 depict a realization of one embodiment of the present invention. A set of nodes is shown in FIG. 1, including node $N_0$ and a set of neighboring nodes $\{N_1, \ldots, N_{10}\}$. The present invention can be applied either in a distributed or a centralized fashion. In the distributed case, each node collects information about its neighbors, their characteristics and capabilities as well as the cost for joining a resiliency strategy. Therefore, although neighbor to neighbor links are not shown in the drawing, each node is able to communicate with one or more neighboring nodes or is able to discover relevant information about one or more neighboring nodes. This process is shown in the process diagram of FIG. 8 and indicated as "Neighbor Discovery". This information is combined with real-time failure observations, a-priori failure models and the specification of a cost function to perform the multi-dimensional optimization and select the optimal set of peers. The diagram shown in FIG. 1 highlights a distributed implementation, where node $N_0$ computes the optimal set of peers independently. However, the methodology of the invention is equally applicable to a centralized implementation in which a central node has full information about all the system nodes, costs and optimization objectives.

While preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

The terms "a" or "an," as used herein, are defined as "one or more than one." The term "plurality," as used herein, is defined as "two or more than two." The term "another," as used herein, is defined as "at least a second or more." The terms "including" and/or "having," as used herein, are defined as "comprising" (i.e., open language). The terms "program," "software application," and the like as used herein, are defined as "a sequence of instructions designed for execution on a computer system." A program, computer program, or software application typically includes a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A computer-implemented method for selecting at least one replication node from a plurality of eligible nodes in a network, the method comprising the steps of:
   constructing a multidimensional model that defines a multidimensional space, the multidimensional model including the eligible nodes, and each of the dimensions of the multidimensional model being a system characteristic;
   determining a data availability value for each of the eligible nodes;
   determining a cost of deploying each of at least two availability strategies to the eligible nodes; and
   selecting, by a processor, at least one of the eligible nodes for replication of data that is stored on a source node in the network,
   wherein the selecting step comprises selecting the eligible node whose:
      data availability value is determined to be highest among the eligible nodes whose cost of deploying does not exceed a specified maximum cost, or
      cost of deploying is determined to be lowest among the eligible nodes whose data availability value does not exceed a specified minimum data availability value.

2. The computer-implemented method according to claim 1, wherein the step of determining a data availability value includes the sub-steps of:
   determining a distance value for each of the eligible nodes; and
   determining a probability of an independent failure of each of the eligible nodes,
   wherein the determination of the data availability value for each of the eligible nodes is based on the determined distance value and the determined probability of an independent failure for that eligible node.

3. The computer-implemented method according to claim 2, wherein the step of determining a data availability value further includes the sub-step of:
   determining a probability of a correlated failure for combinations of the eligible nodes,
   wherein the determination of the data availability value for each of the eligible nodes is also based on the determined probability of a correlated failure for that eligible node.

4. The computer-implemented method according to claim 1, wherein the eligible nodes comprise geographically distributed data storage entities.

5. The computer-implemented method according to claim 1, wherein the system characteristics comprise at least three of a geographic location, an administrative domain, a hardware type, a hardware version, an operating system type, an operating system version, a network type, and a network service provider.

6. The computer-implemented method according to claim 1, wherein the cost of deploying comprises at least one of a data transfer cost and a hardware cost.

7. The computer-implemented method according to claim 1, further comprising the step of replicating data located on the source node on the at least one eligible node that was selected.

8. A system for replicating data, the system comprising:
   a source node storing data;
   a plurality of replication nodes each coupled to the source node via a network;
   a node selector for selecting at least one of the replication nodes for replication of at least some of the data that is stored on the source node, the node selector including:
      a model constructor for constructing a multidimensional model that defines a multidimensional space, the multidimensional model including the replication nodes, and each dimension of the multidimensional model being a system characteristic;
      a first determiner for determining a data availability value for each of the replication nodes;
      a second determiner for determining a cost of deploying each of at least two availability strategies to the replication nodes; and
      a selector for selecting the replication node whose:
         data availability value is determined to be highest among the replication nodes whose cost of deploying does not exceed a specified maximum cost, or
         cost of deploying is determined to be lowest among the replication nodes whose data availability value does not exceed a specified minimum data availability value.

9. The system according to claim 8, wherein the first determiner determines a distance value for each of the eligible nodes, determines a probability of an independent failure of each of the eligible nodes, and determines the data availability value for each of the eligible nodes based on the determined distance value and the determined probability of an independent failure for that eligible node.

10. The system according to claim 9, wherein the first determiner also determines a probability of a correlated failure for combinations of the eligible nodes, and determines the data availability value for each of the eligible nodes also based on the determined probability of a correlated failure for that eligible node.

11. The system according to claim 8, wherein the system characteristics comprise at least three of a geographic location, an administrative domain, a hardware type, a hardware version, an operating system type, an operating system version, a network type, and a network service provider.

12. The system according to claim 8, wherein the cost of deploying comprises at least one of a data transfer cost and a hardware cost.

13. The system according to claim 8, wherein the source node replicates data stored on the source node on the at least one replication node that was selected.

14. A computer readable storage medium storing a computer program for selecting at least one replication node from a plurality of eligible nodes in a network, the computer program comprising instructions for performing the steps of:
  constructing a multidimensional model that defines a multidimensional space, the multidimensional model including the eligible nodes, and each of the dimensions of the multidimensional model being a system characteristic;
  determining a data availability value for each of the eligible nodes;
  determining a cost of deploying each of at least two availability strategies to the eligible nodes; and
  selecting at least one of the eligible nodes for replication of data that is stored on a source node in the network,
  wherein the selecting step comprises selecting the eligible node whose:
    data availability value is determined to be highest among the eligible nodes whose cost of deploying does not exceed a specified maximum cost, or
    cost of deploying is determined to be lowest among the eligible nodes whose data availability value does not exceed a specified minimum data availability value.

15. The computer readable storage medium according to claim 14, wherein the step of determining a data availability value includes the sub-steps of:
  determining a distance value for each of the eligible nodes; and
  determining a probability of an independent failure of each of the eligible nodes,
  wherein the determination of the data availability value for each of the eligible nodes is based on the determined distance value and the determined probability of an independent failure for that eligible node.

16. The computer readable storage medium according to claim 15, wherein the step of determining a data availability value further includes the sub-step of:
  determining a probability of a correlated failure for combinations of the eligible nodes,
  wherein the determination of the data availability value for each of the eligible nodes is also based on the determined probability of a correlated failure for that eligible node.

17. The computer readable storage medium according to claim 14, wherein the cost of deploying comprises at least one of a data transfer cost and a hardware cost.

18. The computer readable storage medium according to claim 14, wherein the computer program further comprises instructions for performing the step of replicating data located on the source node on the at least one eligible node that was selected.

* * * * *